May 23, 1967 A. W. PRATT 3,321,638
REGULATOR SYSTEMS

Filed Aug. 30, 1963 4 Sheets-Sheet 1

INVENTOR
Aloysius W. Pratt

BY *Stewart F. Moore*

ATTORNEY

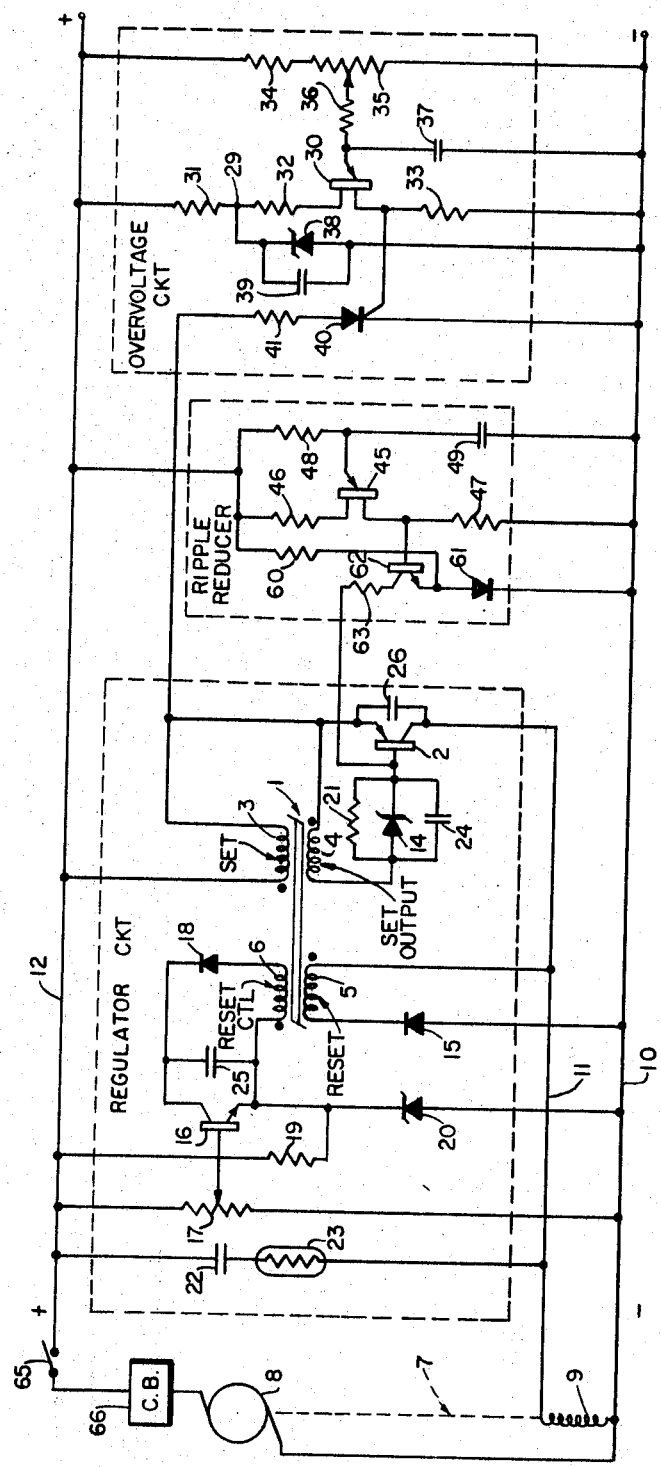

INVENTOR
Aloysius W. Pratt

BY
ATTORNEY

INVENTOR
Aloysius W. Pratt
BY
ATTORNEY

United States Patent Office 3,321,638
Patented May 23, 1967

3,321,638
REGULATOR SYSTEMS
Aloysius W. Pratt, New Carlisle, Ohio, assignor to American Machine & Foundry Company, a corporation of New Jersey
Filed Aug. 30, 1963, Ser. No. 305,773
11 Claims. (Cl. 307—57)

This invention relates to regulator systems, and more particularly to regulator systems for maintaining desired output levels from electrical generators.

Most automatic regulating systems for electrical generators sense the output from the generator derive an error signal representing the deivation of the output from the desired output level, and then utilize this error signal to correct the generator output to eiminate the error. The earier systems of this type were either mechanical systems, or systems including relays, vacuum tubes, or magnetic amplifiers. These earlier systems, while satisfactory in many installations, generally had one or more disadvantages, such as slow response, poor reliability, or excessive size and weight. When transistors and other solid state control devices became available, considerable development work followed in attempting to use these components in the design of better regulating circuits to overcome the defects of the earlier systems. Many of the contemplated circuit designs patterned after the existing nontransistorized circuits were relatively simple. However, when the necessary compensating and starting circuits were added, these systems became very cumbersome and expensive, often failing to achieve the desired high speed response and reliability.

Thus, an object of this invention is to provide a fast-acting, solid state regulating circuit for controlling an electrical generator, which employs relatively few components and which is therefore relatively small, lightweight, and highly reliable.

Another object of the invention is to provide a regulating circuit employing a saturable reactor as a timing element to control a power transistor, operating the transistor in a switching mode to control the heavy field current flow of an electrical generator, and thereby achieving a small, lightweight, highly reliable regulating circuit.

Another object of this invention is to provide a solid state regulating system which can build up field energization from the initial residual magnetism generator output without the need for external power sources.

A further object of this invention is to provide a regulating system of the aforementioned type for controlling energization of the generator field winding in an on-off fashion wherein the off time is sufficiently short to prevent undesirable ripples in the generator output.

Still another object of this invention is to provide a regulating system of the aforementioned type which automatically prevents energization of the generator field when an overloaded output condition exists.

Yet another object of this invention is to provide a regulating system of the aforementioned type which can be used to control electrical generators connected in parallel.

Still another object of the invention is to provide a regulating system of the aforementioned type which can control either D.C. generators or A.C. generators.

Another object of this invention is to provide a regulating system of the afornentioned type which can effectively control the generator output over a wide range of operating conditions.

In order that the manner in which these and other objects are attained in accordance with the invention can be understood in detail, reference is made to the accompanying drawings, which form a part of this specification, and wherein:

FIG. 2 is a schematic diagram of a regulating system in accordance with another embodiment of this invention specifically including a ripple reducing circuit and an overvoltage protection circuit;

*Basic regulator circuit*

Figure 1:
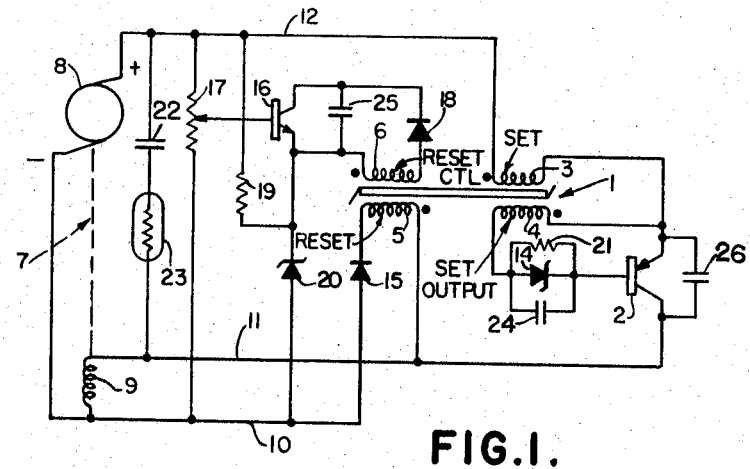
FIG. 1 is a schematic diagram illustrating the basic regulating system in accordance with this invention.

The basis regulator circuit in accordance with this invention is shown schematically in FIG. 1 and includes a saturable reactor that provides timing signals to a power transistor 2, which, in turn, controls the generator field winding energization in an on-off fashion. The saturable reactor is connected so that a fixed period of time is required for driving the saturable reactor into one of the saturation states, which is referred to as the SET state for convenience. The power transistor is rendered conductive only while the saturable reactor is being driven toward the SET state. The transistor becomes completely conductive, providing successive pulses of a desired amplitude and duration to the generator field winding. The saturable reactor is also connected so that the time required to drive the saturable reactor from the SET state toward and into the other state, referred to as the RESET state, is variable as a function of the generator output. Accordingly, the average value of the energizations applied to the field winding varies in accordance with the generator output, thus providing a control of the generator field energization in a servoloop fashion to maintain a desirable generator output.

Transistors cannot be rendered conductive until the applied emitter-base potential exceeds the threshold voltage of the emitter-base junction, which is normally about 0.5 volt. If the generator being regulated is of the self-energizing type, i.e., of a type which uses a portion of the generator output to enregize the field winding, this minimum threshold voltage of the power transistor can cause a considerable problem, since the initial generator output caused by residual magnetism is often less than 0.5 volt. In accordance with this invention, however, the saturable reactor is connected so that the A.C. ripple component of the generator output initially passes through the saturable reactor, rendering the power transistor partially conductive. Thereafter, the D.C. component can begin to flow through the power transistor and build up field winding energization by regenerative action. The turns ratio of the saturable reactor is selected to step up the small ripple component to a sufficient value of potential to initially render the power transistor conductive.

The regulating circuit is shown connected to a conventional shunt-wound D.C. generator 7 having an armature 8 and a field winding 9. The negative brushes associated with armature 8 are connected to one end of field winding 9 and to a negative conductor 10. The opposite end of field winding 9 is connected to a conductor 11 and the positive brushes associated with armature 8 are connected to a positive output conductor 12.

Saturable reactor 1 includes a core of magnetizable material, preferably a material having a high residual magnetism such as characterized by a rectangular hysteresis loop. Four windings are wound about the legs of the saturable reactor core and are oriented with respect to one another in accordance with the dot convention, as shown in FIG. 1. These windings are set winding 3, set output winding 4, reset winding 5 and reset control winding 6.

Power transistor 2 is a PNP type germanium transistor having sufficient current carrying capacity to control energization of field winding 9. One end of set winding 3 is connected to positive supply conductor 12, and the other end is connected to the emitter of power transistor 2. The collector of the power transistor is connected to field winding 9 via conductor 11. Thus, when the power transistor is rendered conductive, current flows from the positive supply conductor, through set winding 3, the emitter-collector circuit of transistor 2, and field winding 9 to negative conductor 10. Set winding 3 is oriented on the core of saturable reactor 1 so that when winding 3 is energized in the manner described, the core is driven toward the SET state.

One end of set output winding 4 is connected to the emitter of power transistor 2 and the other end of the set output winding is connected to the base of the power transistor via a Zener diode 14, the cathode of the Zener diode being connected directly to the base of the power transistor. The set output winding is oriented with respect to the core of saturable reactor 1 so that the potential induced in the set output winding renders the emitter of the power transistor positive with respect to the base while the core is being driven toward the SET state. Thus, this potential developed by the set output winding causes a current to flow through the emitter-base circuit of the power transistor and through Zener diode 14 from cathode to anode, thereby rendering the power transistor conductive. The back resistance of the emitter-base junction of transistor 2 prevents current flow in the opposite direction, which would otherwise occur as the saturable reactor is being driven toward the opposite saturation state, i.e., the RESET state.

It should be noted that, when current flows through the base of the power transistor, the potential drop across the emitter-base junction of power transistor 2 is of a fixed value as a result of the inherent characteristics of the transistor, and that the potential drop across Zener diode 14 is also of a fixed value as a result of the inherent characteristics of the Zener diode. As will be explained hereinafter in greater detail, there is no significant current flow in reset winding 5 or reset control winding 6 while the saturable reactor is being driven toward the SET state. Therefore, the time required to drive the saturable reactor from the RESET state to the SET state is the same for each successive energization of set winding 3, since the volt-time integral determines the saturation thereof and since the potential across the set output winding has a fixed value.

Reset winding 5 is connected in series with a semi-conductor diode 15 and this series combination is connected between conductors 10 and 11 or, in other words, across field winding 9. Current must continue to flow in field winding 9 after power transistor 2 has been rendered nonconductive because of the high reactance of field winding 9. The current sustained by this reactance flows in a path completed through diode 15 and reset winding 5, thereby energizing the reset winding while power transistor 2 is nonconductive. Reset winding 5 is oriented with respect to the core of saturable reactor 1 so that this current flow drives the core toward the RESET state. Current, which would otherwise flow through reset winding 5 during the conductive cycle of power transistor 2, is prevented by diode 15.

The rate at which the core is driven into the RESET state is determined by the conductive state of a transistor 16 connected across reset control winding 6. Transistor 16 is an NPN type transistor with the base thereof being connected to the variable tap of the voltage divider resistor 17. Resistor 17 is connected between conductors 12 and 10, or, in other words, across armature 8. The emitter of transistor 16 is connected to one end of reset control winding 6 and the other end of the winding is connected to the collector of the transistor via a semiconductor diode 18, the anode of the diode being connected to the reset control winding. A resistor 19 is connected in series with a Zener diode 20, this series combination being connected between conductors 10 and 12. The cathode of Zener diode 20 is connected to the emitter of transistor 16 to provide a reference potential for the regulator. When the potential at the base of transistor 16 is more positive than the reference potential applied to the emitter, transistor 16 becomes conductive and becomes increasingly conductive as the base potential becomes more positive. Reset control winding 6 is oriented with respect to the core of saturable reactor 1 so that, as the core is being driven toward the RESET state, current flows through diode 18 and the collector-emitter circuit of transistor 16. The potential across reset control winding 6, which also determines the potential across reset winding 5, is determined in accordance with the conductive state of transistor 16. Therefore, as transistor 16 becomes more conductive, the potential across reset control winding 6 decreases, thereby increasing the time required to drive saturable reactor 1 into the RESET state. As transistor 16 becomes less conductive, the potential across reset control winding 6 increases, and therefore the time required to drive the core into the RESET state decreases.

Figure 1A:
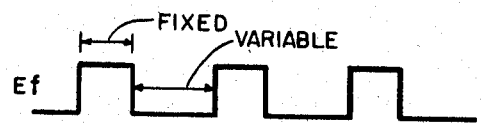
FIGS. 1a–1d are curves illustrating the generator field winding potential and current for various load conditions.

The steady state operation of the regulator circuit is explained assuming that field winding 9 has previously been energized and that the normal output potential appears between conductors 10 and 12. It is also assumed that saturable reactor 1 is initially in the RESET state, and hence, that there is no potential across set output winding 4. Under these circumstances, power transistor 2 is not back-biased, and therefore a small leakage current flows through the emitter-collector circuit thereof. This leakage current flows from conductor 12 through set winding 3, the emitter-collector circuit, conductor 11, and field winding 9 to conductor 10, thereby energizing set winding 3 and inducing a potential across set output winding 4. The turns ratio between set winding 3 and set output winding 4 is selected so that the potential across the set output winding is sufficient to render transistor 2 conductive when the leakage current flows through the power transistor. When the power transistor becomes conductive, the current flow increases and therefore the potential applied to the base of transistor 2 increases rapidly, driving the transistor into saturation or, in other words, into the fully conductive state. The emitter-base junction of power transistor 2 and the characteristics of Zener diode 14 maintain a fixed potential across set output winding 4 while saturable reactor 1 is being driven toward the SET state. The time required to drive the saturable reactor into the SET state is determined accordingly. When the saturable reactor reaches the saturation condition, the potential across set output winding 4 ceases, thereby causing the power transistor 2 to abruptly become nonconductive. Thus, it is apparent that a pulse of electrical energy is provided to energize field winding 9 while the power transistor is conductive. The time duration, or width, of the energizing pulse is established as is illustrated in FIG. 1a, which shows the potential $E_f$ applied to the field winding.

After power transistor 2 has become nonconductive, current continues to flow in the field winding in a path completed through diode 15 and reset winding 5. Current flow through the reset winding drives the saturable reactor toward the RESET state. As this occurs, a potential is induced in set output winding 4, which makes the base of transistor 2 positive with respect to the emitter. Therefore, the power transistor becomes back-biased and fully nonconductive, to thereby substantially eliminate any leakage current through the emitter-collector circuit. The time required to drive saturable reactor 1 into the RESET state is determined by the conductive state of transistor 16, which, in turn, is determined by the potential between conductors 10 and 12. Accordingly, the saturable reactor reset time is variable, as indicated in FIG. 1a. When the saturable reactor reaches the RESET state of saturation, the back-biasing potential developed by set output winding 4 ceases, allowing leakage current to flow once more through transistor 2. This leakage current then initiates another cycle during which a second energizing pulse is applied to the field winding.

Figure 1B:
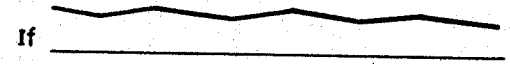
Figure 1C:
Figure 1D:
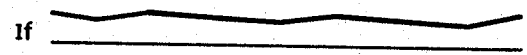

If the generator output potential appearing between conductors 10 and 12 increases, the base of transistor 16 becomes more positive, driving transistor 16 to a more conductive condition. This decreases the potential across reset control winding 6 while the saturable reactor is being reset, thereby increasing the spacing between successive energizing pulses, as shown in FIG. 1c when compared to FIG. 1a. The current flow $I_f$ in the field winding is proportional to the average value of the energizing pulses. Therefore, as the spacing between successive pulses increases, the current flow in the field winding decreases, which is illustrated when comparing FIG. 1d with FIG. 1b. Thus, an increase in the output potential between conductors 10 and 12 decreases the field winding current, which, in turn, brings about a decrease in the output potential. On the other hand, if the generator output potential tends to decrease, transistor 16 becomes less conductive, thereby decreasing the reset time of saturable reactor 1. This action, in turn, decreases the spacing between successive pulses, thereby increasing the field winding current, bringing about an increase in the generator output voltage. The desired generator output level is selected by appropriate adjustment of the variable tap on resistor 17.

The circuit for initially energizing the field winding comprises a capacitor 26 connected between the emitter and collector of power transistor 2, and a resistor 21 connected across Zener diode 14. For purposes of discussion, it is assumed that the generator being regulated is a conventional 28-volt D.C. generator of the type found in aircraft, where the residual magnetism will provide an output potential somewhat less than 0.5 volt when the field winding is not energized. It should be noted that power transistor 2 is initially nonconductive and therefore no D.C. current can flow through the power transistor to energize set winding 3 or field winding 9. The output potential from a direct current generator always includes a small ripple component, which for conventional aircraft generators operating without field winding energization is an A.C. signal of approximately 25 millivolts. This A.C. component passes through capacitor 20 and energizes set winding 3. Accordingly, a potential, increased by the turns ratio, is induced in set output winding 4. Since the resulting current flow is quite small, there is very little voltage drop across resistor 21, and therefore, a positive potential of sufficient amplitude is applied at the base of transistor 2 during alternate half-cycles to render transistor 2 slightly conductive. As a result, the D.C. current begins to flow through set winding 3, the emitter-base circuit of transistor 2, and field winding 9. This current flow increases the potential at the base of transistor 2, thereby rendering the transistor more conductive. This current flow also energizes field winding 9, and therefore, the output potential provided by armature 8 increases. As the armature potential increases, a further increase in the base potential and field winding energization occurs. Thus, by means of this regenerative action, transistor 2 soon becomes fully conductive and field winding 9 becomes fully energized. Thereafter, the regulating circuit operates in the manner previously described.

A capacitor 22 is connected in series with a negative temperature-coefficient resistor 23, this series combination being connected between conductors 12 and 10. Capacitor 22 improves the starting characteristics at high ambient temperatures. Negative temperature-coefficient resistor 23 increases in impedance value as temperature decreases, and therefore, effectively disconnects capacitor 22 at low ambient temperature. This is necessary so that capacitor 22 will not adversely affect residual voltage starting characteristics at low temperatures.

Capacitor 24 is connected across Zener diode 14 to improve the switching characteristics of power transistor 2. While transistor 2 is conductive, current flows through Zener diode 14, thereby charging capacitor 24 and establishing a positive potential at the plate connected to the base of transistor 2. When saturable reactor 1 becomes saturated in the SET state, the potential across set output winding 4 ceases, thereby effectively connecting capacitor 24 between the base and emitter of transistor 2. Thus, capacitor 24 back-biases transistor 2 to render the transistor fully nonconductive as soon as the saturable reactor is driven into the SET state and before the normal back-biasing potential can be provided by the set output winding as the saturable reactor is being driven toward the RESET state.

Capacitor 25 is connected across the collector-emitter circuit of transistor 16 to absorb the high potentials which would otherwise appear across the transistor when the generator output voltage suddenly decreases. If the generator output voltage decreases sufficiently, transistor 16 will become fully back-biased and therefore fully nonconductive. Reset winding 5 and reset control windings 6 act as a current transformer while the saturable reactor is being driven toward the RESET state. If transistor 16 is fully nonconductive under these circumstances, an extremely high potential would be developed across the transistor, which could be sufficient to injure the transistor. Capacitor 25 absorbs these sudden high potentials to effectively protect the transistor.

*Overvoltage protection and ripple reducing system*

Another regulator system is shown in FIG. 2 wherein the regulator circuit portion is the same as that previously described in FIG. 1 and therefore like reference numerals are employed. The system in FIG. 2 further includes an overvoltage protection circuit which is operative to prevent further energization of the generator field winding when the potential between conductors 10 and 12 becomes excessive. The system in FIG. 2 also includes a ripple reducer circuit that decreases the time interval between successive energizing pulses applied to field winding 9.

The overvoltage circuit includes a unijunction transistor 30 having one base element connected to negative conductor 10 via a resistor 33, and having the other base element connected to positive conductor 12 via resistors 31 and 32 connected in series. The cathode of a Zener diode 38 is connected to junction 29 between resistors 31 and 32, and the anode of the Zener diode is connected to negative conductor 10. Zener diode 38 maintains a fixed potential between junction 29 and negative conductor 10 regardless of any voltage variations appearing at the generator output. This fixed potential causes a preselected interbase current to flow through the unijunction transistor, which interbase current determines the peak point voltage for the transistor. This peak point voltage can be defined as the voltage which, when applied to the emitter of the unijunction transistor, causes the transistor to break down and conduct. A capacitor 39 is connected across Zener diode 38 to maintain the Zener diode potential at junction 29 when the potential difference between conductors 10 and 12 drops below the Zener voltage.

Resistors 34 and 35 are connected in series between conductors 10 and 12 to form a voltage divider. The emitter of unijunction transistor 30 is connected to the variable tap of resistor 35 via a resistor 36. A capacitor 37 is connected between the emitter of unijunction transistor 30 and negative conductor 10.

The overvoltage circuit also includes a silicon-controlled rectifier 40 having its gate element connected to the junction between resistor 33 and the base of unijunction transistor 30 connected to resistor 33. The cathode of the controlled rectifier is connected to the negative conductor 10 and the anode of the controlled rectifier is connected to the junction between set winding 3 and the emitter of power transistor 2 via a resistor 41.

Under normal operating conditions, capacitor 37 becomes charged, but the potential across the capacitor does not exceed the peak point voltage of unijunction transistor 30. However, when an excessive voltage appears between conductors 10 and 12, the charge on capacitor 37 reaches a value that, if the excessive voltage remains sufficiently long, will exceed the peak point voltage of unijunction transistor 30, causing the unijunction transistor to break down and conduct. When this occurs, the capacitor discharges through resistor 33, thereby increasing the potential across the resistor. This increase in potential makes the gate element of the controlled rectifier sufficiently positive so that the controlled rectifier will become conductive. Once conductive, the controlled rectifier remains conductive by means of internal regeneration and therefore current flows from conductor 12 through set winding 3, resistor 41, and the controlled rectifier from anode to cathode, to conductor 10. This current flow very rapidly drives saturable reactor 10 into the SET state, the saturable reactor remaining in this SET state as a result of controlled rectifier 40 remaining conductive. There is no potential induced in set output winding 4 while the saturable reactor remains in the SET state, and therefore, transistor 2 becomes nonconductive, preventing field winding 9 from becoming energized. Thus, it can be seen that excessive voltages between conductors 10 and 12 effectively turn off the regulator circuit and prevent further energization of the field winding.

A current-responsive circuit breaker 66 and a switch 65 are connected in series between armature 8 and positive conductor 12. Switch 65 can be opened momentarily to interrupt current flow through controlled rectifier 40 to permit the controlled rectifier to return to the nonconductive state. If the cause of the overvoltage condition is eliminated, the regulator will resume normal operation when switch 65 is subsequently closed. If the source of the overvoltage condition happens to be a power transistor shorted between emitter and collector, the heavy current flow through resistor 41 will cause circuit breaker 66 to disconnect conductor 12 to thereby protect the apparatus.

The ripple reducer circuit includes a relaxation oscillator comprising a unijunction transistor 45 having one base connected to positive conductor 12 via a resistor 46 and the other base connected to the negative conductor 10 via a resistor 47. Current flow through the interbase circuit determines the peak point voltage for unijunction transistor 45. One plate of a capacitor 49 is connected to negative conductor 10 and the other plate of the capacitor is connected to the emitter of unijunction transistor 45 and to positive conductor 12 via a resistor 48.

The base of an NPN type transistor 62 is connected to resistor 47 and the emitter of transistor 62 is connected to negative conductor 10 via a semiconductor diode 61. The collector of the transistor 62 is connected to the base of power transistor 2 via a resistor 63. A resistor 60 is connected between the anode of diode 61 and positive conductor 12. This resistor 60 maintains current flow through diode 61 even during the periods when transistor 62 is nonconductive, so that the emitter of transistor 62 is maintained at approximately 0.5 volt positive with respect to negative conductor 10. This feature is provided so that the interbase current flowing through resistor 47 does not provide sufficient potential to render transistor 62 conductive.

When the normal generator output potential is applied between conductors 10 and 12, capacitor 49 charges and continues to charge until the potential across the capacitor reaches the peak point voltage of unijunction transistor 45. The potential across capacitor 49 then causes the unijunction transistor to become conductive, thereby discharging the capacitor through resistor 47. The increase in potential across resistor 47, resulting from the discharge current flow, renders transistor 62 conductive. When transistor 62 is rendered conductive, current flows from positive conductor 12 through set winding 3, the emitter-base circuit of power transistor 2, resistor 63, the collector-emitter circuit of transistor 62 and diode 61, to negative conductor 10, thus rendering the power transistor 2 conductive whether or not there is any potential being provided by set output winding 4.

When the regulator circuit operates without the ripple reduced circuit, the time between successive energizing pulses applied to field winding 9 is determined by the time required to reset the saturable reactor 1. Therefore, when there are light generator loads, the space between successive energizing pulses becomes considerable, resulting in a sizable ripple component in the field winding current and the generator output. When the ripple reducer circuit is used with the regulator circuit, as shown in FIG. 2, the time interval between successive field winding energizing pulses is determined by the operating frequency of the relaxation oscillator. The values of resistor 48 and capacitor 49 are selected to obtain a desired operating frequency so that the interval between successive field winding pulses is sufficiently small to prevent any substantial ripple components from existing in the field winding current or the generator output. The operating frequency of the relaxation oscillator should be sufficiently high so that the time interval between successive field winding energization pulses is less than the minimum anticipated time interval which would occur by the operation of the regulating circuit without the ripple reducer circuit.

As has been previously described, the rate at which the saturable reactor is driven toward the SET state is fixed, since it is determined by the fixed potential across set output winding 4. The rate at which the saturable reactor is driven toward the RESET state is variable in accordance with the generator output potential as controlled by the conductive state of transistor 16. This means, that when power transistor 2 is initially rendered conductive, current flows through the set winding and the potential induced across set output winding 4 maintains the transistor conductive until the saturable reactor reaches saturation. Thereafter, the saturable reactor is driven toward the RESET state at a rate which is a function of the generator output. The ripple reduced modifies the independent action of the regulator, since the operating frequency of the ripple reducer circuit is sufficiently high so that the power transistor is again rendered conductive before the saturable reactor reaches the RESET state. Therefore, since the time between successive energizations of the power transistor is fixed, and the rate at which the saturable reactor is driven toward the RESET state is variable in accordance with the generator output, the degree of RESET achieved is a function of the generator output. Thereafter, when the saturable reactor is driven toward the SET state at a fixed rate, the time required to reach the SET state of saturation is proportional to the degree of RESET, and hence, is a function of the generator output. Accordingly, it is seen that the ripple reducer circuit maintains the time interval between successive energizing pulses constant, but causes the width of the pulses to vary as a function of the generator output.

If the generator output potential tends to decrease, transistor 16 becomes less conductive, thereby increasing the rate at which saturable reactor 1 is driven toward the RESET state. Therefore, the saturable reactor is driven further toward the RESET condition and the time required to subsequently drive the saturable reactor into the SET state of saturation is increased, resulting in a longer field winding energization pulse. The longer energization pulse tends to increase the generator output potential. On the other hand, if the generator output tends to increase, the degree of saturable reactor RESET becomes less, causing the width of the field winding energizing pulse to be decreased, thereby decreasing the general output potential.

Generator paralleling system

Figure 3:
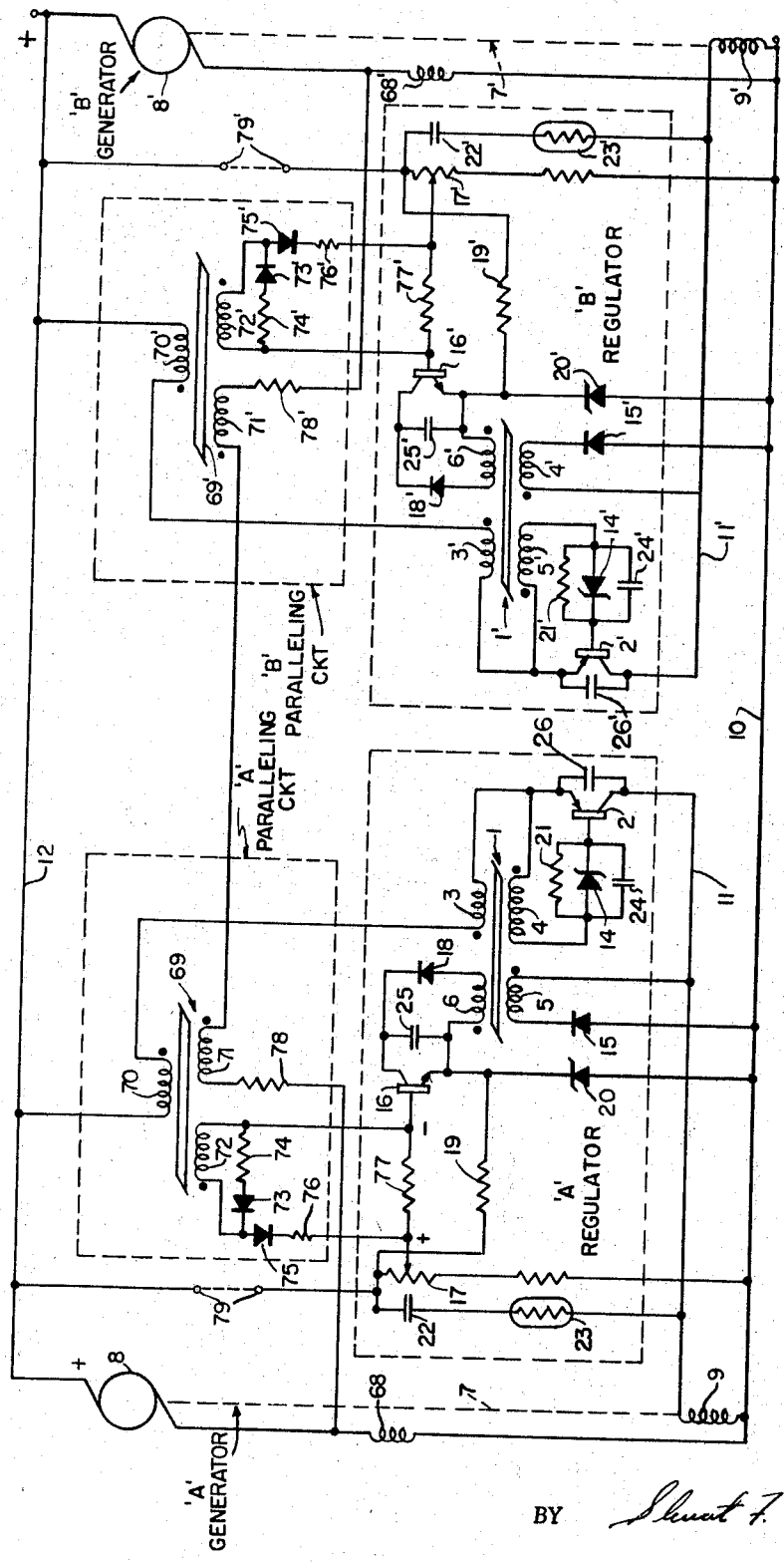
FIG. 3 is a schematic diagram illustrating a regulating system in accordance with this invention which is specifically adapted to control generators connected in parallel.

The system shown in FIG. 3 includes two regulator circuits interconnected to control two direct current generators connected in parallel. One of these regulator circuits, referred to as the A regulator, is connected to control the field winding of one of the D.C. generators, referred to as the A generator 7. The regulator circuit and the generator are essentially the same as the regulator and generator previously described in FIG. 1 and therefore like reference numerals are employed. The other regulator circuit shown in FIG. 3 is referred to as the B regulator and the other D.C. generator is referred to as the B generator. This regulator circuit and generator are also essentially the same as the regulator and generator circuit previously described in FIG. 1, and therefore like reference numerals are employed; but, to distinguish the two regulator circuits, reference numerals with primes are employed.

The D.C. generators in FIG. 3 are shown including their interpole windings 68 and 68'. These interpole windings are commonly found in conventional D.C. generators connected between the negative brush associated with the armature and the negative output conductor. When the generator is in operation, a small potential is developed across the interpole winding which is proportional to the generator output current. When shunt-wound generators are being regulated, a small resistor is connected in place of the interpole winding to similarly develop the small potential proportional to the generator output current.

The regulator circuits are interconnected by means of two paralleling circuits referred to as the A paralleling circuit associated with the A regulator and A generator and the B paralleling circuit associated with the B regulator and B generator.

The A paralleling circuit includes a saturable reactor 69 having a core constructed from a magnetic material, preferably having a nearly rectangular hysteresis loop. Three windings are each wound about the core and are oriented with respect to one another in accordance with the dot convention as indicated in FIG. 3. These windings are a set winding 71, a reset winding 70, and an output winding 72.

One end of reset winding 70 is connected to positive conductor 12. The other end is connected to set winding 3 of saturable reactor 1 so that reset winding 70 is connected in series with set winding 3, and hence, in series with the emitter-collector circuit of power transistor 2 and field winding 9. Thus, when power transistor 2 is rendered conductive, current flows through the series circuit, energizing reset winding 70, set winding 3, and field winding 9.

A series circuit including a semiconductor diode 73 and a resistor 74 is connected across output winding 72. Another series circuit including semiconductor diode 75, resistor 76, and resistor 77 is also connected across output winding 72. Diode 73 is connected so that resistor 74 provides a path for current flow while saturable reactor 69 is being driven toward the RESET state. Diode 75 is connected to permit current flow through resistors 76 and 77 while the saturable reactor is being driven toward the SET state. Resistor 77 is connected between the variable tap on voltage divider resistor 17 and the base of transistor 16.

The B paralleling the circuit includes similar components connected to the B regulator circuit in the same fashion, and therefore corresponding reference numerals, with primes, are utilized to designate the corresponding components. One end of set winding 71 in the A paralleling circuit is connected to one end of set winding 71' in the B paralleling circuit. The other end of set winding 71 is connected to the negative brush associated with armature 8 via a resistor 78 and the other end of set winding 71' is connected to the negative brush associated with the armature 8' via a resistor 78'. If the negative brush of the B generator is positive with respect to the negative brush of the A generator, circuit will flow from armature 8' through resistor 78', set winding 71', set winding 71, and resistor 78. The set windings are oriented with respect to their associated reset windings so that saturable reactor 69' is driven toward the RESET state and so that saturable reactor 69 is driven toward the SET state when this current flows. If, on the other hand, the negative brush of armature 8 is positive with respect to the negative brush of armature 8', current flows in the opposite direction, thereby driving saturable reactor 69 toward the RESET state and saturable reactor 69' toward the SET state.

When the system is in operation, the two regulator circuits operate more or less independently to control energization of their respective field windings so as to maintain the potential between conductors 10 and 12 at a desired level. However, it is possible that one of the generators might tend to provide a larger portion of the load current than the other generator, a condition which is prevented by means of the paralleling circuit arrangement. If, for example, the B generator tends to carry the larger portion of the load, the current flow through interpole winding 68' is greater than the current flow through interpole winding 68, and therefore, the negative brush of armature 8' becomes slightly positive with respect to the negative brush of armature 8. The resulting current flow through set winding 71 drives saturable reactor 69 toward the SET state, thereby inducing a potential across output winding 71, which, in turn, causes current flow through diode 75, resistor 76, and resistor 77. As a result, a potential is developed across resistor 77 which is negative at the end connected to the base of transistor 16. The potential across resistor 77 is therefore subtracted from the potential provided by voltage divider resistor 17, so that the base of transistor 16 becomes somewhat more negative and transistor 16 becomes somewhat less conductive. When this occurs, the potential across reset control winding 6 increases while saturable resistor 1 is being driven toward the RESET state, the time interval between successive energizing pulses applied to field winding 9 decreases. Accordingly, the A generator field winding current increases, thereby causing the A generator to carry a larger portion of the generator load.

It should be noted that set winding 71' and reset winding 70' both tend to drive saturable reactor 69' toward the RESET state, and therefore saturable reactor 69' remains in the RESET state so that no potential is developed across output winding 72'. Therefore, the B regulator is not affected by the current flow between the negative brushes of the armatures.

It should also be noted that reset windings 70 and 70' are energized to reset their respective cores while the associated transistors 2 and 2' are conductive. Therefore, saturable reactors 69 and 69' can be driven toward the SET state to provide a potential across the associated resistors 77 and 77' during the time interval that transistors 16 and 16' are controlling the reset time of saturable reactors 1 and 1'.

If the A generator attempts to carry a larger portion of the load, current flows in the opposite direction through set windings 71 and 71', and therefore, a potential is developed across resistor 77' instead of resistor 77. This potential has the effect of decreasing the time interval between successive field winding energization pulses applied to the field winding 9', thereby causing the B generator to carry a larger portion of the load.

Terminals 79 and 79' are shown connected by dotted lines which connect resistors 17 and 17' between conductors 10 and 12 at the generator output. In some installations, it may be desirable to connect the regulator circuits so that the generators are controlled to maintain a desired potential across the load, or portion of the load, instead of across the generator output. This is accomplished by breaking the connections between terminals 79 and 79' and by then connecting resistors 17 and 17' across the load device. In this manner, the input potential for the regulator circuits is derived from the load instead of from generator output.

*Alternator regulating system*

Figure 4:
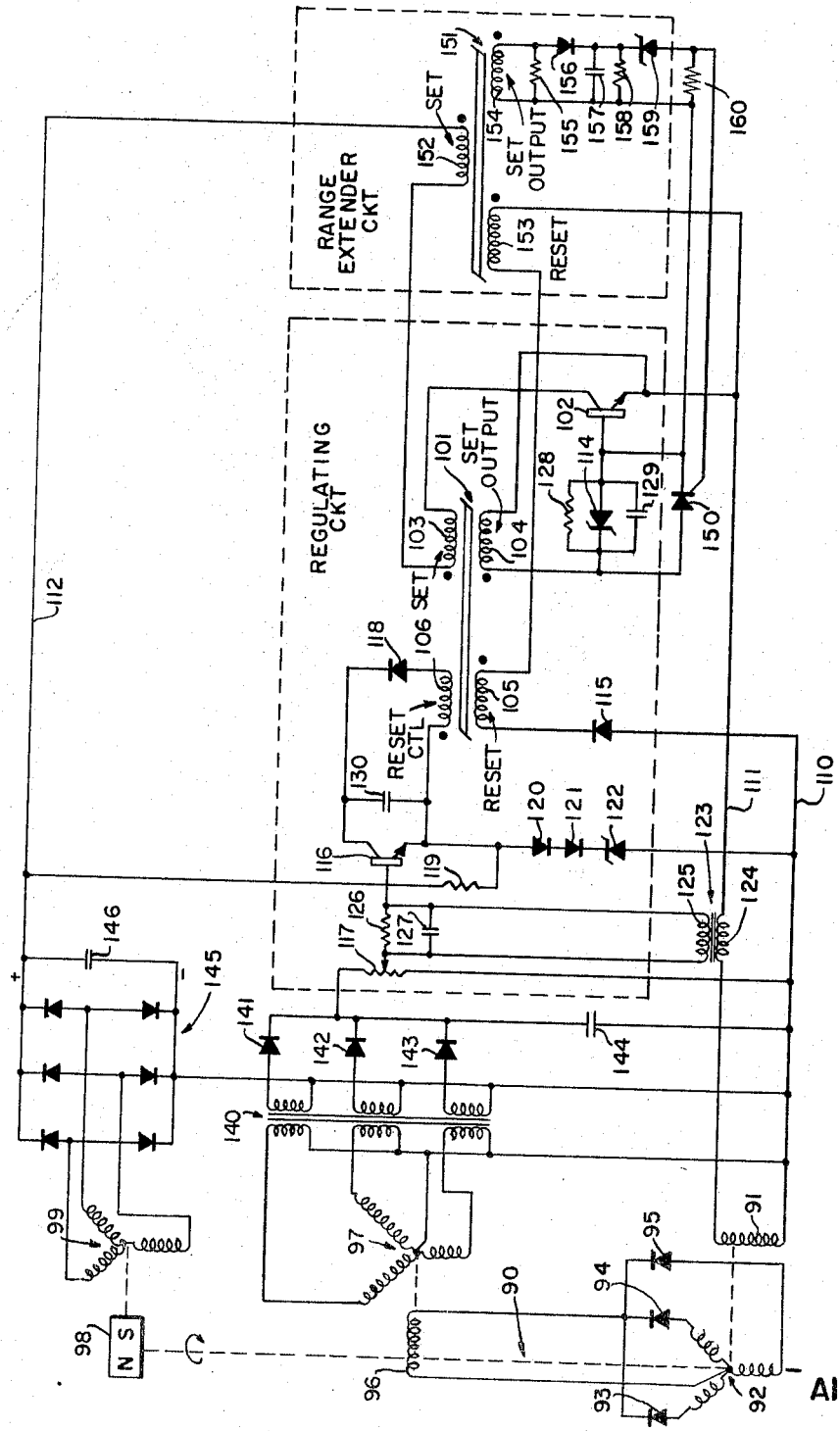
FIG. 4 is a schematic diagram illustrating a regulating system in accordance with this invention specifically adapted to control A.C. generators.

The regulating system shown schematically in FIG. 4 is adapted to control a three-phase alternating current generating machine including three separate generators interconnected on a common rotating shaft. One of these generators is referred to as the field generator and includes a field winding 91 on the stator and an associated three-phase winding 92 on the rotor. A second one of these generators is referred to as the main generator and includes a field winding 96 on the rotor and a three-phase output winding 97 on the stator. The free ends of three-phase winding 92 are each connected to a different one of semiconductor diodes 93–95, the common cathode junction of these diodes being connected to one end of field winding 96. The other end of field winding 96 is connected to the center connection of three-phase winding 92. Current flow through field winding 91 determines the potential developed by three-phase windings 92 which in turn determines current flow through field winding 96. Field winding 96 controls the three-phase generator output developed by three-phase winding 97 which is connected to the main generator load (not shown). The third generator is referred to as the excitation generator and includes a permanent magnet 98 on the rotor and a three-phase winding 99 on the stator.

The three-phase winding 99 is connected to six semiconductor diodes interconnected to form a three-phase full-wave rectifier circuit 145. The negative output from rectifier circuit 145 is connected to a common conductor 110 and the positive output from the rectifying circuit is connected to positive conductor 112. A filter capacitor 146 is connected across the rectifying circuit output. The excitation generator provides the required potential for the regulating circuit and for energizing field winding 91.

The output from the main generator passes through a three-phase step-down transformer 140 and is then rectified to provide a signal for the regulating circuit which is proportional to the generator output. Transformer 140 includes three separate primary windings each having one end connected to negative conductor 110, and the common junction of three-phase winding 97. The free ends of three-phase winding 97 are individually connected to the other ends of the primary windings. Transformer 140 also includes three second windings, each having one end connected to common conductor 110. The other ends of the secondary windings are connected, respectively, to the anodes of semiconductor diodes 141, 142, and 143. A filter capacitor 140 is connected between the common cathode junction of diodes 141–143 and negative conductor 110. The D.C. potential appearing across capacitor 144 is proportional to the three-phase A.C. output of the main generator.

The regulating system shown in FIG. 4 includes a regulating circuit which is similar to that previously described in FIG. 1, and a range extender circuit which is operative to increase the width of the field winging energization pulses when the main generator provides a heavy current for the load.

The range extender circuit includes a saturable reactor 151 having a core of magnetizable material, preferably having a substantially rectangular hysteresis loop. Saturable reactor 151 also includes three windings wound about the core. These windings being a set winding 152, a reset winding 153 and a set output winding 154. The regulating circuit includes a saturable reactor 101 having a set winding 103, a set output winding 104, a reset winding 105, and a reset control winding 106 individually wound about the saturable reactor core. The windings on these saturable reactors are oriented with respect to one another in accordance with the dot convention, as indicated in FIG. 4.

Reset winding 152, set winding 103, the collector-emitter circuit of power transistor 102, and field winding 91 are connected in series so that current flows to energize the three windings when the power transistor is conductive. Set windings 152 and 103, when energized, are operative to drive their respective saturable reactors toward one of the saturated states refered to as the SET state.

One end of set output winding 104 is connected to the emitter of power transistor 102 which is an NPN type silicon transistor. The other end of set output winding 104 is connected to the base of transistor 102 via a Zener diode 114, the anode of Zener diode 114 being connected to the base of transistor 102. Set output winding 104 is oriented with respect to set winding 103 so that the potential across the set output winding renders the base of transistor 102 positive with respect to the emitter while the saturable reactor is being driven toward the SET state. The rate at which the saturable reactor is driven toward the SET state is determined by the potential across set output winding 104 or, in other words, is determined by the emitter-base potential drop of transistor 102 and a potential drop across Zener diode 114. When saturable reactor 101 is being driven toward the opposite state of saturation, referred to as the RESET state, the potential induced in set output winding 104 is positive at the emitter of transistor 102 and therefore the transisor is back-biased and becomes fully nonconductive. A resistor 128 is connected in parallel with Zener diode 114 to improve the starting characteristics of transistor 102 by back biasing the transistor as soon as saturable reactor 101 reaches the SET state of saturation.

Reset windings 102 and 153 are connected in series with one another and in series with a semiconductor diode 115. This series combination is connected between conductors 110 and 111 or, in other words across field winding 91. When transistor 102 is nonconductive, the reactance of field winding 91 tends to maintain current flow which flows through diode 115 and the reset windings. The reset windings 105 and 153 are oriented with respect to associated set windings 103 and 152 so that this current flow tends to drive the saturable reactors toward the RESET state.

Transistor 116 is connected across reset control winding 106 to vary the potential across the reset control winding in accordance with the main generator output potential. Transistor 116 is an NPN type transistor and has its emitter connected to one end of winding 106 and its collector connected to the other end of the reset control winding via a semiconductor diode 118. The cathode of diode 118 is connected to the collector of transistor 116. A capacitor 130 is connected between the collector-emitter of transistor 116 to absorb the high potentials which would otherwise occur as a result of sudden decreases in the generator output potential. A pair of semiconductor diodes 120 and 121 are connected in series with one another and in series with a Zener diode 122. This series circuit is connected between the emitter of transistor 116 and conductor 110 to provide a reference potential for the regulator. Diodes 120 and 121 are connected to pass current flow in the same direction and the cathode of diode 121 is connected to the cathode of Zener diode 122 so that diodes 120 and 121 provide temperature compensation for the Zener diode. A resistor 119 is connected between the anode of diode 120 and conductor 112 to provide a path for current flow that is required to maintain the reference potential across the diodes.

A voltage divider resistor 117 is connected between the common cathode junction of diodes 141–143 and conductor 110. The potential appearing at the variable tap of resistor 117 is proportional to the main generator output potential. This variable tap is connected to the base of transistor 116 via a resistor 126. The primary winding 124 of a transformer 123 is series connected in conductor 111. The secondary winding 125 of transformer 123 is connected across resistor 126 and a capacitor 127 is connected in parallel with resistor 126. Transformer 123, capacitor 127 and resistor 126 provide a feedback circuit, which prevents instability which would otherwise be present because of the time delay in the control loop. The reactance of windings 91, 92, 96, and 97 each delay the effect of variations on field winding 91 upon three-phase output winding 97. The variations in the field winding energizing current produce a potential on secondary winding 125 and resistor 126. Capacitor 127 provides the appropriate phase shift so that the feedback will prevent instability which would otherwise occur.

The regulating circuit shown in the FIG. 4 operates in essentially the same manner as that previously described in FIG. 1. Current flow through set winding 103 drives saturable reactor 101 toward the SET state at a rate determined by the potential across set output winding 104. As a result, power transistor 102 is periodically rendered conductive to provide energizing pulses to field winding 91, these pulses each being of the same time duration over the normal operating range of the regulating circuit. Reset winding 105 is energized when power transistor 102 is nonconductive and when energized drives the saturable reactor toward the RESET state. The time required for the saturable reactor to reach saturation, and hence the time interval between successive field winding energizing pulses, is determined by the conductive state of transistor 116. As the generator output potential tends to increase, transistor 116 becomes more conductive thereby increasing the reset time of the saturable reactor and the interval between successive energizing pulses applied to field winding 91. The resulting decrease in field winding energization tends to decrease the generator output potential. On the other hand, if the generator output potential tends to decrease, transistor 116 becomes less conductive, thereby decreasing the saturable reactor reset time and the interval between successive energizing pulses.

A resistor 155 is connected across set output winding 154 in the range extender circuit. A semiconductor diode 156 is connected in series with a filtering capacitor 157, this series combination being connected across set output winding 154. A resistor 158 is connected in parallel with capacitor 157. The cathode of Zener diode 159 is connected to the cathode of diode 156, and the anode of the Zener diode is connected to the gate element of a silicon-controlled rectifier 150. The anode-cathode circuit of control rectifier 150 is in parallel with Zener diode 114 so that the cathode of the control rectifier is connected to the base of power transistor 102 and to one end of set output winding 154. A resistor 160 is connected between the anode and gate element of control rectifier 150.

The saturable reactor in the range extender circuit operates in synchronism with the saturable reactor in the regulating circuit. That is, current flow through set windings 152 and 103 drives saturable reactors 151 and 102 toward the SET state at the same time and current flow through reset windings 153 and 105 drives both saturable reactors toward the reset state at the same time. Set output winding 154 is oriented with respect to set and reset windings of saturable reactor 151 so that the potential induced in the set output winding while the saturable reactor is being driven toward the SET state, produces a current which flows through diode 156. The potential developed across resistor 155 is proportional to the field winding energizing current which flows through set winding 152 when power transistor 102 is conductive. The potential across resistor 155 is rectified by diode 156, filtered by capacitor 157, and therefore a smooth D.C. potential appears across resistor 158. When the potential across resistor 158 is sufficient to overcome the threshold potential of Zener diode 159, current flows through resistor 160, making the gate element of control rectifier 150 positive with respect to the cathode. Thus, control rectifier 150 can become conductive when the field winding energizing current flowing through set winding 152 is sufficient to provide a potential across resistor 158 which overcomes the threshold voltage of Zener diode 159.

When controlled rectifier 150 becomes conductive, it effectively short circuits Zener diode 114 and therefore reduces the potential appearing across set output 104. This decreases the rate at which saturable reactor 101 is driven toward the SET state, and therefore increases the time duration of the energizing pulses applied to field winding 91. It should be noted that when saturable reactor 101 is being driven toward the SET state, the anode of control rectifier 150 is positive with respect to the cathode and therefore the control rectifier can be rendered conductive. However, when saturable reactor 101 is being driven toward the RESET state the control rectifier is back-biased and is therefore rendered nonconductive. Accordingly, control rectifier 150 is rendered conductive only while saturable reactor 101 is being driven toward the SET state provided that a heavy field winding current exists.

When control rectifier 150 is rendered conductive, to thereby increase the duration of the field winding energizing pulses, there is a tendency for the generator output voltage to increase considerably. However, this tendency renders transistor 116 more conductive to thereby immediately increase the spacing between successive energizing pulses to thereby prevent any increase in the output potential. Thus, it can be seen that the range extender circuit increases the operating range of the regulating circuit in the heavy output current region.

While only a few illustrative embodiments of the invention have been described in detail, it should be obvious to those skilled in the art that there are numerous variations within the scope of this invention. The invention is more particularly defined in the appended claims.

What is claimed is:

1. In a regulator system for a generator having a field winding for controlling the generator output, the combination of
    a semiconductor switching device connected to control energization of the generator field winding in on-off fashion;
    a saturable reactor having a set winding, a set output winding, a reset winding and a reset control winding, operatively associated therewith;
    said set winding being operatively connected to drive said saturable reactor toward one state of saturation when said semiconductor device is conductive and said reset winding being operatively connected to drive said saturable reactor toward the other state of saturation where said semiconductor device is nonconductive;
    said set output winding being connected to maintain said semiconductor device conductive while said saturable reactor is being driven toward said one state of saturation;
    means responsive to the generator output and connected to said reset control winding, said means being operative to maintain a potential across said reset control winding while said saturable reactor is being driven toward said other state which is a function of the generator output.

2. A regulator system in accordance with claim 1 wherein the generator field winding and said set winding are connected in series with said semiconductor device across the generator output so that the generator field winding and said set winding are energized when said semiconductor device is rendered conductive.

3. A regulator system in accordance with claim 1 further comprising
a unidirectionally conductive device connected in series with said reset winding, and
wherein said reset winding is connected so that the same is energized by the reactive current flow sustained by the generator field winding when said semiconductor device is nonconductive.

4. A regulator system in accordance with claim 1 further comprising
a second semiconductor device capable of maintaining a fixed potential, and wherein
said switching device is a transistor, the base-emitter circuit thereof being connected in series with said second semiconductor device and being connected so that current flow through said base-emitter circuit and said second semiconductor device maintains a fixed potential across said set output winding while said saturable reactor is being driven toward said one state of saturation.

5. A regulator system in accordance with claim 1 wherein
said means is a transistor so connected that the conductive state thereof varies as a function of the generator output, said transistor being connected to control the potential across said reset control winding while said saturable reactor is being driven toward said other state of saturation.

6. In a regulating system for a self-energized D.C. generator normally providing a small alternating ripple component at the output thereof, the combination of
a transistor;
a saturable reactor having a set winding and a set output winding operatively associated therewith;
said set winding, said transistor and the generator being interconnected so that said set winding and the generator field winding are energized from the generator output when said transistor is conductive;
said set winding being operative to drive said saturable reactor toward one state of saturation when energized by current flow through said transistor and said set output winding being operative to maintain said transistor conductive while said saturable reactor is being driven toward said one state of saturation;
means for driving said saturable reactor toward the other state of saturation when said transistor is nonconductive;
and a capacitor connected across said transistor so that the alternating ripple component of the generator output can energize said set winding to induce a potential in said set output winding sufficient to render said transistor slightly conductive so that the D.C. generator output current can begin to flow through said transistor.

7. In a regulator system in accordance with claim 1 further including an overvoltage circuit comprising
a controlled rectifier connected to said set winding and operative, when conductive, to maintain current flow through said set winding regardless of the conductive state of said semiconductor device; and
circuit means for rendering said controlled rectifier conductive when the generator output level exceeds a predetermined value.

8. In a regulator system in accordance with claim 4 further comprising
a third semiconductor device connected across said second semiconductor device to effectively short-circuit the same when conductive; and
circuit means connected to said third semiconductor device and operative to render the same conductive when the generator field winding energization exceeds a predetermined value.

9. Apparatus in accordance with claim 8 wherein said third semiconductor device is a silicon controlled rectifier which can be rendered conductive while said saturable reactor is being driven toward said one state of saturation and which is rendered nonconductive when said saturable reactor is driven toward said other state of saturation.

10. Apparatus in accordance with claim 8 wherein said circuit means connected to said third semiconductor device comprises
a saturable reactor connected to provide a potential proportional to the generator field winding current and
a Zener diode connected to render said third semiconductor device conductive when said potential exceeds a predetermined value.

11. In a regulator system for controlling two generators connected in parallel, the combination of
a semiconductor device associated with each of said generators and operative to control energization of the field winding thereof in on-off fashion;
a saturable reactor interconnected with each of said semiconductor devices so that the saturable reactor is driven toward one state of saturation when said device is conductive and toward the other state of saturation when said device is nonconductive;
circuit means associated with each of said saturable reactors and operative to render the associated semiconductor device conductive when the saturable reactor is being driven toward said one state of saturation;
circuit means associated with each of said saturable reactors and operative to control the rate at which the saturable reactor is driven toward said other state of saturation as a function of the output potential from said generators; and
paralleling circuit means connected between the generators and operative to vary the rate at which one of said saturable reactors is driven toward said other state of saturation when one of said generators provides more current than the other;
said paralleling circuit means comprising a pair of additional saturable reactors each associated with one of said semiconductor devices and connected to be driven toward one state of saturation when the associated semiconductor device is conductive, said additional saturable reactors being interconnected so that one of said additional saturable reactors is driven toward the other state of saturation when one of the generators provides the larger portion of the load current and so that the other of said additional saturable reactors is driven toward the other state of saturation when the other generator provides the larger portion of the load current, that one of said additional saturable reactors which is driven toward said other state of saturation being operatively connected to increase field winding energization of an associated one of the generators.

References Cited by the Examiner

UNITED STATES PATENTS

| | | | |
|---|---|---|---|
| 2,740,086 | 3/1956 | Evans | 322—28 |
| 3,061,735 | 10/1962 | Joy | 307—57 |
| 3,154,733 | 10/1964 | Pratt | 322—73 X |
| 3,170,110 | 2/1965 | Pratt | 322—73 X |
| 3,214,599 | 10/1965 | Willford | 307—84 |

ORIS L. RADER, *Primary Examiner.*

T. J. MADDEN, *Assistant Examiner.*